United States Patent
Lee et al.

(10) Patent No.: US 10,427,357 B2
(45) Date of Patent: Oct. 1, 2019

(54) SYSTEM FOR MANUFACTURING DISPLAY UNIT

(71) Applicant: LG CHEM, LTD., Seoul (KR)

(72) Inventors: Beom Seok Lee, Daejeon (KR); Suk Jae Lee, Daejeon (KR); San Park, Daejeon (KR); Hang Suk Choi, Daejeon (KR); Eung Jin Jang, Daejeon (KR); Bong Su Jeung, Daejeon (KR); Jea Han Ryoo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/319,145

(22) PCT Filed: Oct. 16, 2017

(86) PCT No.: PCT/KR2017/011369
§ 371 (c)(1),
(2) Date: Jan. 18, 2019

(87) PCT Pub. No.: WO2018/117384
PCT Pub. Date: Jun. 28, 2018

(65) Prior Publication Data
US 2019/0217550 A1    Jul. 18, 2019

(30) Foreign Application Priority Data
Dec. 23, 2016  (KR) .................. 10-2016-0178231

(51) Int. Cl.
*B29C 65/00*         (2006.01)
*G02F 1/00*          (2006.01)
(Continued)

(52) U.S. Cl.
CPC ......... *B29C 65/4805* (2013.01); *B65H 20/02* (2013.01); *B65H 35/06* (2013.01);
(Continued)

(58) Field of Classification Search
CPC ... B29C 65/4805; B29C 55/023; B65H 20/02; B65H 35/06; B65H 37/04; B65H 41/00;
(Continued)

(56) References Cited

U.S. PATENT DOCUMENTS 7,022,204 B2 *  4/2006  Kanbara ............... B32B 37/182
                                              156/235
7,980,285 B2 *  7/2011  Kitada .................... B32B 37/18
                                              156/511
(Continued)

FOREIGN PATENT DOCUMENTS

KR      20100055388 A  *  5/2010  ......... B32B 38/1841
KR    1020100055388 A     5/2010
(Continued)

*Primary Examiner* — Linda L Gray
(74) *Attorney, Agent, or Firm* — Dentons US LLP

(57) ABSTRACT

A system for manufacturing a display unit including: a transport unit which transports an optical film comprising a polarizing film, an adhesive layer, and a release film, by a predetermined transport length and stops the transport of the optical film; a cutting unit which cuts the optical film in a width direction at a predetermined cutting position without cutting the release film; a separating unit which separates the release film from the polarizing film at the cutting position; and an attaching unit which attaches the polarizing film, from which the release film is separated, to a panel. The transport unit includes a horizontal roll satisfying the following conditional expression:

$$I^*n < H < I^*(n+1)$$

in which I is the predetermined transport length, n is an integer equal to or greater than 0, and H is a horizontal distance between a rotation center of the horizontal roll and the cutting position.

8 Claims, 4 Drawing Sheets

(51) Int. Cl.
*B65H 37/00* (2006.01)
*B65H 41/00* (2006.01)
*B65H 35/00* (2006.01)
*G02B 5/00* (2006.01)
*B29C 65/48* (2006.01)
*B65H 20/02* (2006.01)
*G02F 1/1335* (2006.01)
*B65H 37/04* (2006.01)
*B65H 35/06* (2006.01)
*G02B 5/30* (2006.01)
*B29K 29/00* (2006.01)

(52) U.S. Cl.
CPC .............. *B65H 37/04* (2013.01); *B65H 41/00* (2013.01); *G02F 1/133528* (2013.01); *B29K 2029/04* (2013.01); *G02B 5/3033* (2013.01); *Y10T 156/1074* (2015.01); *Y10T 156/1335* (2015.01)

(58) Field of Classification Search
CPC ......... G02F 1/133528; G02F 1/133536; G02F 1/1303; B29K 2029/04; B32B 2038/045; B32B 2457/202; G02B 5/3033; G02B 5/305; Y10T 156/1074; Y10T 156/1335
See application file for complete search history.

(56) References Cited

U.S. PATENT DOCUMENTS

| | | | |
|---|---|---|---|
| 8,366,858 B2 * | 2/2013 | Kitada | B32B 38/185 156/257 |
| 8,529,722 B2 * | 9/2013 | Umemoto | B32B 37/0015 156/164 |
| 2008/0286455 A1 | 11/2008 | Hamamoto | |
| 2010/0258249 A1 | 10/2010 | Kitada et al. | |
| 2010/0283943 A1 | 11/2010 | Kimura et al. | |
| 2010/0294418 A1 | 11/2010 | Yura et al. | |
| 2011/0086193 A1 | 4/2011 | Nakazono et al. | |
| 2012/0118488 A1 | 5/2012 | Umemoto et al. | |
| 2014/0378020 A1 | 12/2014 | Hada et al. | |
| 2015/0277162 A1 | 10/2015 | Yura et al. | |
| 2017/0341363 A1 | 11/2017 | Lee et al. | |

FOREIGN PATENT DOCUMENTS

| | | | | |
|---|---|---|---|---|
| KR | 101019621 B1 | 3/2011 | | |
| KR | 101051868 B1 | 7/2011 | | |
| KR | 1020120053492 A | 5/2012 | | |
| KR | 20120106542 A | * 9/2012 | ......... | B29D 11/0073 |
| KR | 1020120106542 A | 9/2012 | | |
| KR | 101470582 B1 | * 7/2014 | ............... | G02F 1/13 |
| KR | 101470582 B1 | 12/2014 | | |
| KR | 101520866 B1 | 5/2015 | | |
| KR | 101674355 B1 | * 11/2016 | ............... | B32B 7/12 |
| KR | 101674355 B1 | 11/2016 | | |
| TW | 200843942 A | 11/2008 | | |
| TW | 201001363 A1 | 1/2010 | | |
| TW | 01219889 A1 | 5/2012 | | |
| TW | 201346380 A | 11/2013 | | |
| TW | 201615385 A | 5/2016 | | |

* cited by examiner

[Figure 1]
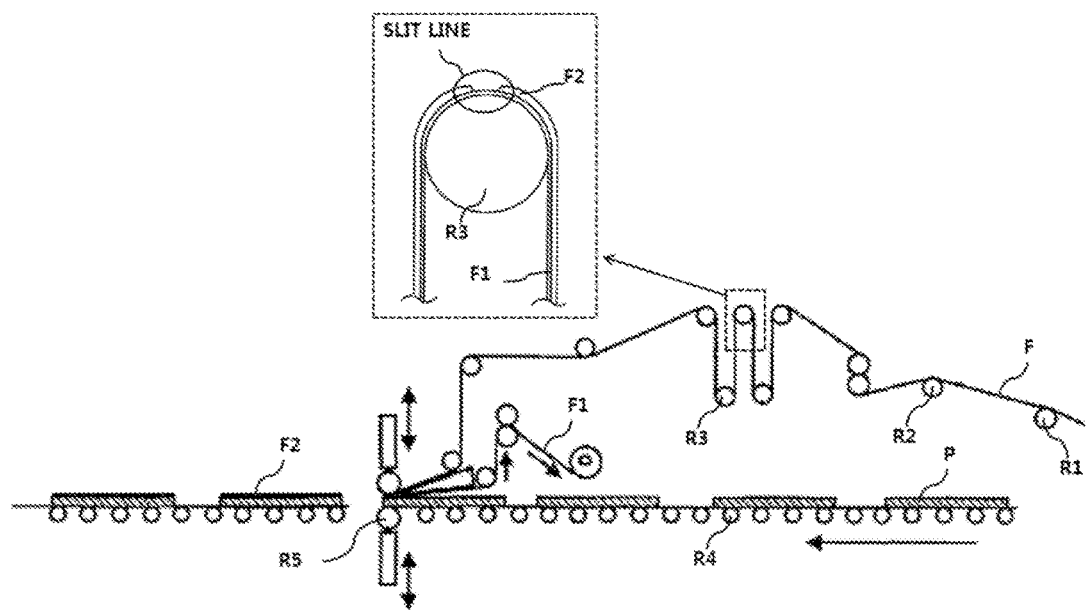

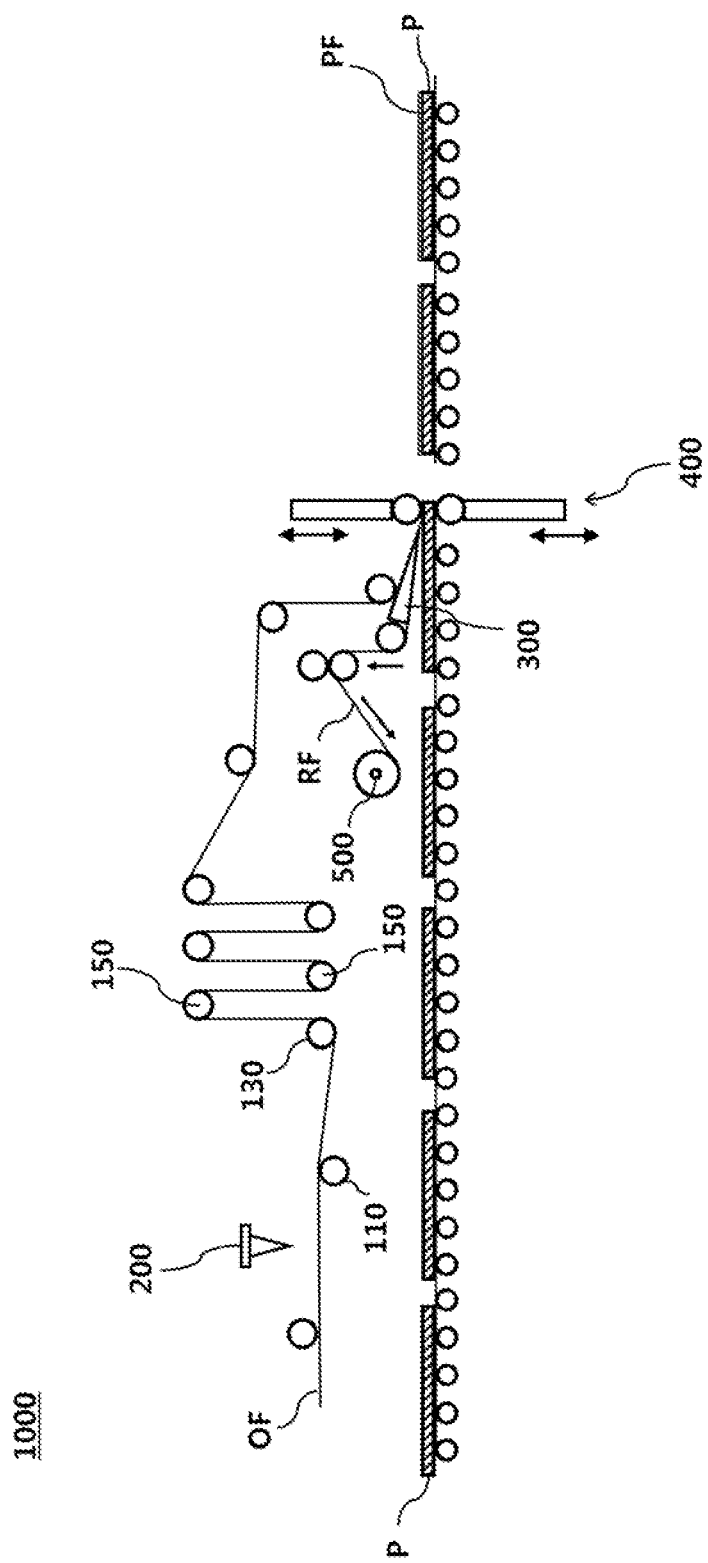
[Figure 2]

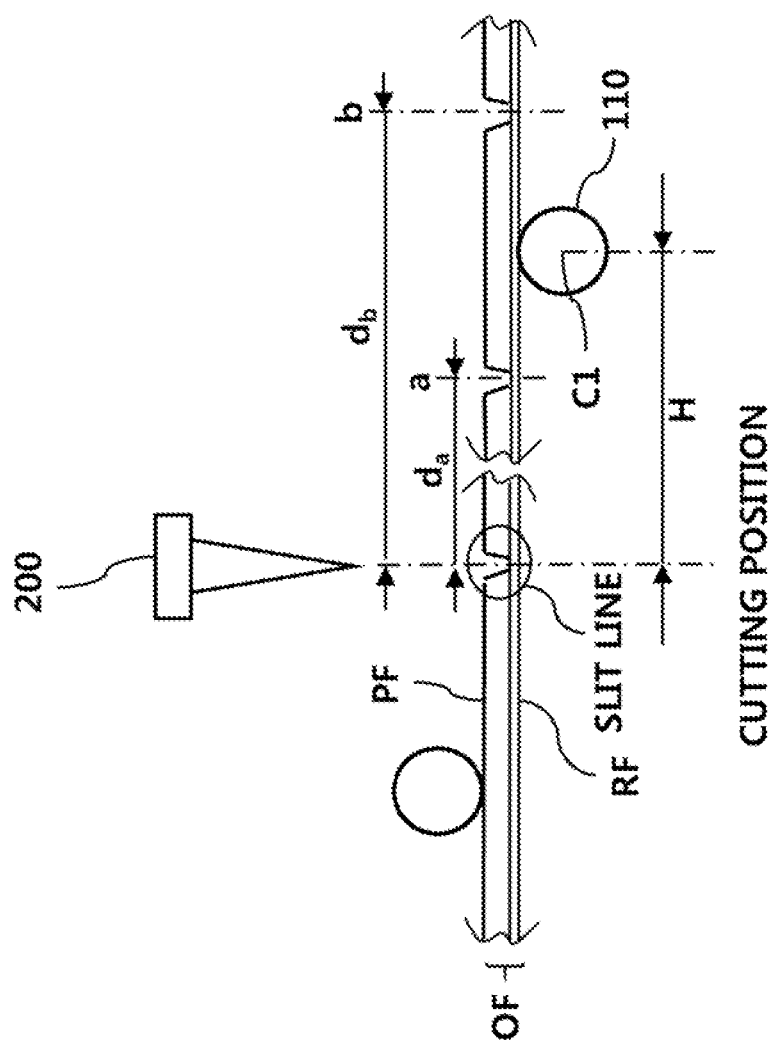

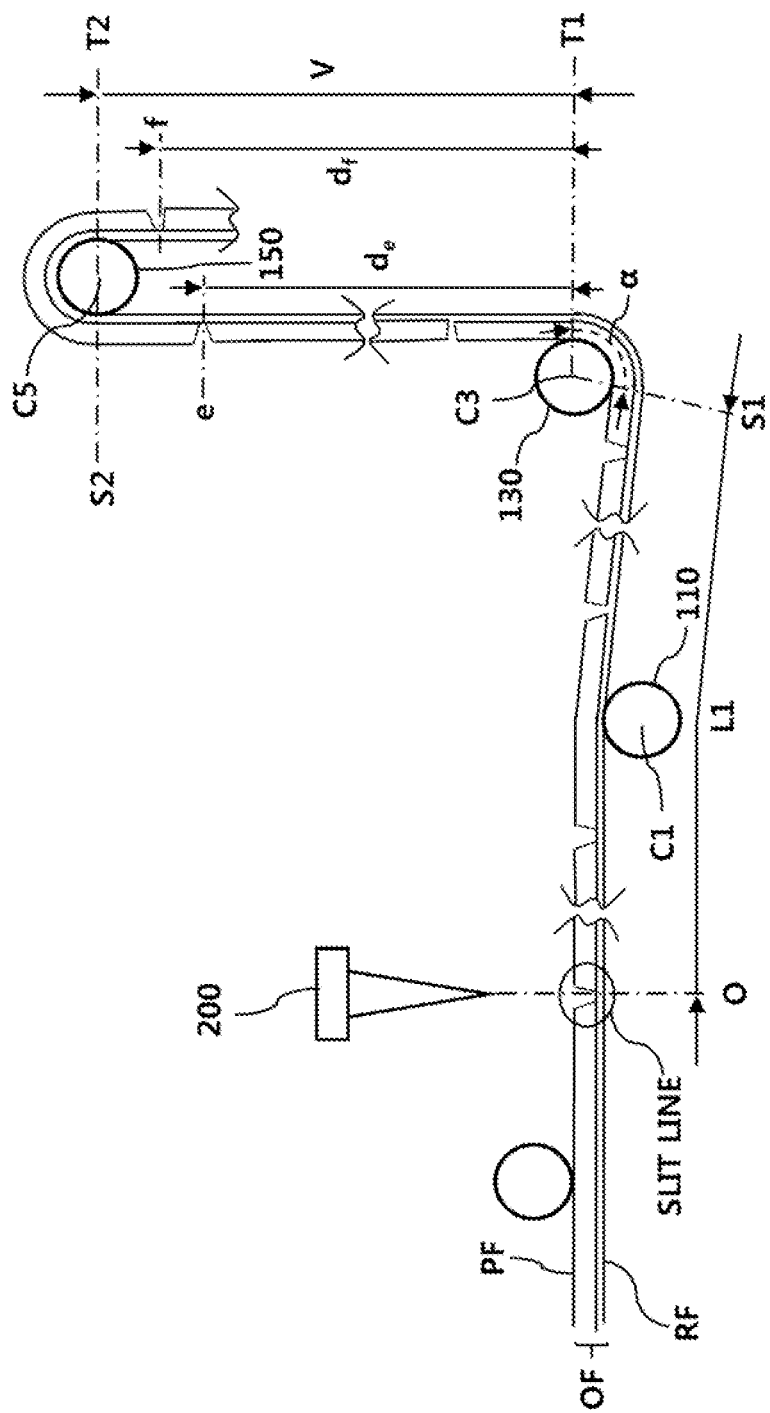
[Figure 4]

SYSTEM FOR MANUFACTURING DISPLAY UNIT

This application is a National Stage Application of International Application No. PCT/KR2017/011369, filed Oct. 16, 2017, and claims the benefit of Korean Patent Application No. 10-2016-0178231, filed Dec. 23, 2016, the contents of which are incorporated herein by reference in their entirety for all purposes as if fully set forth below.

TECHNICAL FIELD

The present invention relates to a system for manufacturing a display unit, and more particularly, to a system for manufacturing a display unit which manufactures the display unit by attaching an optical film to a panel.

BACKGROUND ART

Display units including liquid crystal displays (LCDs), organic light emitting diodes (OLEDs), plasma display panels (PDPs), electrophoretic displays (EPDs), and the like are manufactured through several processes. Optical films are attached to one surface and the other surface of a panel, respectively, to manufacture the display unit, and the panel normally operates in a case in which an absorption axis of the optical film attached to one surface of the panel and an absorption axis of the optical film attached to the other surface of the panel are perpendicular to each other. A process of attaching the optical film to one surface of the panel will be described below.

FIG. 1 is a view illustrating an example of the process of attaching the optical film to one surface of the panel.

Referring to FIG. 1, in the process of attaching the optical film to one surface of the panel, a supply roller R1, which supplies an optical film F having a width corresponding to a short side of a panel P, supplies the optical film F, and the supplied optical film F is moved to an attachment position, at which the optical film F is attached to the panel P, by a transport roller R2. Before the optical film F is attached to the panel P, a slit line (hereinafter, referred to as a half cut) is formed in the optical film F by a predetermined depth, but not to the depth a release film F1 is cut. Change rollers R3, which change a transport direction of the optical film F, may be installed to reduce a space in which the optical film F is transported. The panel P is moved to the attachment position by moving rollers R4, and when the optical film F and the panel P are moved to the attachment position, a pair of attaching rollers R5 attaches the optical film F to the panel P.

Meanwhile, in the process of manufacturing the display unit by attaching the optical film F to the panel P, it is essential to perform an optical film transporting process for moving the optical film to the attachment position in order to attach the optical film to one surface of the panel, and a cutting process for forming the slit line in the optical film to form sheet pieces of a polarizing film.

Further, it is necessary to stop the transport of the optical film in order to perform the cutting process.

However, in the process of manufacturing the display unit in the related art, a process of transporting the optical film F to a predetermined transport length and then stopping the transport of the optical film is repeatedly performed, but in some instances, the slit line formed in the optical film comes into contact with and is supported by the transport roller R2 or the change rollers R3 for changing the transport direction of the optical film F when the transport of the optical film F is stopped.

In this case, tension is concentratedly applied to the slit line in the optical film F since the slit line comes into contact with and is supported by the roller R2 or R3, and as a result, there is a problem in that the optical film is deformed because the polarizing film on the optical film is separated from the release film, foreign substances are attached to an adhesive layer of the polarizing film separated from the release film, or a part of the release film is torn or split.

DETAILED DESCRIPTION OF THE INVENTION

Technical Problem

The present invention has been made in an effort to provide a system for manufacturing a display unit, which minimizes deformation of an optical film which is transported during a process of manufacturing a display unit.

Technical Solution

An exemplary embodiment of the present invention provides a system for manufacturing a display unit, the system including: a transport unit which repeatedly transports an optical film, on which a polarizing film, an adhesive layer, and a release film separably attached to the adhesive layer are laminated, by a predetermined transport length and repeatedly stops the transport of the optical film; a cutting unit which cuts the optical film in a width direction at a predetermined cutting position without cutting the release film so as to form a slit line in the optical film; a separating unit which separates the release film from the polarizing film; and an attaching unit which attaches the polarizing film, from which the release film is separated, to a panel, in which the transport unit includes a horizontal roll which is disposed at a downstream side in a transport direction so as to be spaced apart from the cutting position and horizontally transports the optical film, and the horizontal roll satisfies the following conditional expression so that the slit line is not positioned on the horizontal roll when the transport of the optical film is stopped:

$$I^*n < H < I^*(n+1) \qquad \text{<Conditional Expression 1>}$$

in which I is the predetermined transport length, n is an integer equal to or greater than 0, and H is a horizontal distance between a rotation center of the horizontal roll and the cutting position.

The horizontal roll according to the exemplary embodiment of the present invention may satisfy the following conditional expression:

$$I^*(n+0.3) \leq H \leq I^*(n+0.7) \qquad \text{<Conditional Expression 2>}$$

in which I is the predetermined transport length, n is an integer equal to or greater than 0, and H is the horizontal distance between the rotation center of the horizontal roll and the cutting position.

Another exemplary embodiment of the present invention provides a system for manufacturing a display unit, the system including: a transport unit which repeatedly transports an optical film, on which a polarizing film, an adhesive layer, and a release film separably attached to the adhesive layer are laminated, by a predetermined transport length and repeatedly stops the transport of the optical film; a cutting unit which cuts the optical film in a width direction at a predetermined cutting position without cutting the release film so as to form a slit line in the optical film; a separating unit which separates the polarizing film from the release film; and an attaching unit which attaches the polarizing film, which is separated from the release film, to a panel, in which the transport unit includes a transport direction changing roll which is disposed at a downstream side in a transport direction so as to be spaced apart from the cutting position and changes the transport direction of the optical film, and the transport direction changing roll satisfies the following conditional expressions so that the slit line is not positioned on the transport direction changing roll when the transport of the optical film is stopped:

<Conditional Expressions 3 and 4>

$L1 > I*m$ $L2 < I*(m+1)$ in which I is the predetermined transport length, m is an integer equal to or greater than 0, L1 is a length of the optical film from a position where the slit line is formed in the optical film to a position where the optical film and the transport direction changing roll begin to come into contact with each other, and L2 is a length of the optical film from the position where the slit line is formed in the optical film to a position where the contact between the optical film and the transport direction changing roll is terminated.

The transport direction changing roll according to the exemplary embodiment of the present invention may satisfy the following conditional expressions:

<Conditional Expressions 5 and 6>

$L1 \geq I*(m+0.3)$ $L2 \leq I*(m+0.7)$ in which I is the predetermined transport length, m is an integer equal to or greater than 0, L1 is the length of the optical film from the position where the slit line is formed in the optical film to the position where the optical film and the transport direction changing roll begin to come into contact with each other, and L2 is the length of the optical film from the position where the slit line is formed in the optical film to the position where the contact between the optical film and the transport direction changing roll is terminated.

Still another exemplary embodiment of the present invention provides a system for manufacturing a display unit, the system including: a transport unit which repeatedly transports an optical film, on which a polarizing film, an adhesive layer, and a release film separably attached to the adhesive layer are laminated, by a predetermined transport length and repeatedly stops the transport of the optical film; a cutting unit which cuts the optical film in a width direction at a predetermined cutting position without cutting the release film so as to form a slit line in the optical film; a separating unit which separates the polarizing film from the release film; and an attaching unit which attaches the polarizing film, which is separated from the release film, to a panel, in which the transport unit includes a transport direction changing roll which is disposed at a downstream side in a transport direction so as to be spaced apart from the cutting position and changes the transport direction of the optical film to a vertical direction, and a vertical roll which supports the optical film while being in contact with the optical film of which the transport direction is changed to the vertical direction, and the vertical roll satisfies the following conditional expression so that the slit line is not positioned on the vertical roll when the transport of the optical film is stopped:

$I*q - L2 < V < I*(q+1) - L2$  <Conditional Expression 7> in which I is the predetermined transport length, q is an integer equal to or greater than 0, L2 is a length of the optical film from a position where the slit line is formed in the optical film to a position where the contact between the optical film and the transport direction changing roll is terminated, and V is a vertical distance between a rotation center of the vertical roll and the position where the contact between the optical film and the transport direction changing roll is terminated.

The vertical roll according to the exemplary embodiment of the present invention may satisfy the following conditional expression:

$I*(q+0.3) - L2 \leq V \leq I*(q+0.7) - L2$  <conditional Expression 8> in which I is the predetermined transport length, q is an integer equal to or greater than 0, L2 is the length of the optical film from the position where the slit line is formed in the optical film to the position where the contact between the optical film and the transport direction changing roll is terminated, and V is the vertical distance between the rotation center of the vertical roll and the position where the contact between the optical film and the transport direction changing roll is terminated.

The transport direction changing roll according to still another exemplary embodiment of the present invention may vertically change the transport direction of the optical film to a first direction, and the vertical roll may change the transport direction of the optical film being transported in the first direction to a second direction opposite to the first direction and may satisfy the following conditional expressions:

<Conditional Expressions 9 and 10>

$L3 > I*r$ $L4 < I*(r+1)$ in which I is the predetermined transport length, r is an integer equal to or greater than 0, L3 is a length of the optical film from the position where the slit line is formed in the optical film to a position where the optical film and the vertical roll begin to come into contact with each other, and L4 is a length of the optical film from the position where the slit line is formed in the optical film to a position where the contact between the optical film and the vertical roll is terminated.

The vertical roll according to still another exemplary embodiment of the present invention may satisfy the following conditional expressions:

<Conditional Expressions 11 and 12>

$L3 \geq I*(r+0.3)$ $L4 \leq I*(r+0.7)$ in which I is the predetermined transport length, r is an integer equal to or greater than 0, L3 is the length of the optical film from the position where the slit line is formed in the optical film to the position where the optical film and the vertical roll begin to come into contact with each other, and L4 is the length of the optical film from the position where the slit line is formed in the optical film to the position where the contact between the optical film and the vertical roll is terminated.

Advantageous Effects

According to the exemplary embodiment of the present invention, it is possible to minimize deformation of the optical film which is transported to the system for manufacturing a display unit by the transport unit.

BRIEF DESCRIPTION OF DRAWINGS

FIG. 1 is a view illustrating an example of a process of attaching an optical film to one surface of a panel.

FIG. 2 is a view illustrating a system for manufacturing a display unit according to an exemplary embodiment of the present invention.

FIG. 3 is a view for explaining a position relationship of a horizontal roll according to the exemplary embodiment of the present invention.

FIG. 4 is a view for explaining a position relationship between a transport direction changing roll and a vertical roll according to another exemplary embodiment of the present invention.

MODE FOR INVENTION

Hereinafter, exemplary embodiments of the present invention will be described in detail with reference to the accompanying drawings so that those skilled in the art to which the present invention pertains may easily carry out the exemplary embodiments. However, the present invention may be implemented in various different ways, and is not limited to the exemplary embodiments described herein. A part irrelevant to the description will be omitted in the drawings in order to clearly describe the present invention, and similar constituent elements will be designated by similar reference numerals throughout the specification.

The terms used in the present specification will be briefly described, and the present invention will be specifically described.

The terms used in the present invention are those selected from general terms currently widely used in the art in consideration of functions in the present invention, but the terms may vary according to the intention of those skilled in the art, precedents, or new technology in the art. Also, specified terms are selected arbitrarily by the applicant, and in this case, the detailed meaning thereof will be described in the detailed description of the invention. Thus, the terms used in the present invention should be understood based on not simple names but the meaning of the terms and the overall description of the present invention.

Throughout the specification, unless explicitly described to the contrary, the word "comprise" and variations such as "comprises" or "comprising" will be understood to imply the inclusion of stated elements but not the exclusion of any other elements.

Hereinafter, the present invention will be described in detail with reference to the accompanying drawings.

FIG. 2 is a view illustrating a system for manufacturing a display unit according to an exemplary embodiment of the present invention.

A system 1000 for manufacturing a display unit according to the exemplary embodiment of the present invention is a system capable of manufacturing a display unit by cutting a polarizing film PF to a length corresponding to a length of a panel P, and attaching the polarizing films PF to both surfaces of the panel P.

The polarizing film PF used for the system 1000 for manufacturing a display unit may be used in the form of an optical film OF made by laminating at least one film on the polarizing film PF. For example, the optical film OF includes the polarizing film PF, and may further include a film having optical properties, such as a phase difference film, an angle-of-visibility compensation film, or a brightness enhancement film, in addition to the polarizing film PF. That is, the optical film OF, which is made by attaching films having optical properties to one surface or both surfaces of the polarizing film PF, may be used. In addition, protective transparent films may be attached to the polarizing film PF and the film having optical properties in order to protect surfaces of the films. For example, a triacetyl cellulose film, a polyethylene phthalate film, or the like may be used as the protective transparent film. Furthermore, an adhesive layer, which provides attachment force when attaching the polarizing film PF to the panel P, is formed on one surface of the polarizing film PF, and a release film RF may be attached to the adhesive layer in order to protect the adhesive layer. For example, the adhesive layer may include an acrylic based adhesive agent, a silicone based adhesive agent, or a urethane based adhesive agent, and the adhesive layer may have a thickness of 10 to 50 µm. For example, a polyethylene terephthalate based film, a polyolefin based film, or the like may be used as the release film RF.

In addition, the optical film OF used for the system for manufacturing a display unit is formed to be elongated in a longitudinal direction, but the optical film OF wound in a roll shape may be used.

The panel P to which the polarizing film PF is attached includes liquid crystal cells, and the panel P may be classified into a VA type panel, an IPS type panel, and the like.

The system 1000 for manufacturing a display unit may attach the polarizing films PF to both surfaces of the panel P by one of the following examples. As an example of attaching the polarizing films PF to both surfaces of the panel P while reversing the panel P, there may be a method of attaching the polarizing film PF to one surface of the panel P from below the panel P, reversing the panel P, and then attaching the polarizing film PF to the other surface from below the panel P, and a method of attaching the polarizing film PF to one surface of the panel P from above the panel P, reversing the panel P, and then attaching the polarizing film PF to the other surface of the panel P from above the panel P. As an example of attaching the polarizing films PF to both surfaces of the panel P without reversing the panel P, there may be a method of attaching the polarizing film PF to one surface of the panel P from above the panel P and then attaching the polarizing film PF to the other surface of the panel P from below the panel P without reversing the panel P, and a method of attaching the polarizing film PF to one surface of the panel P from below the panel P and then attaching the polarizing film PF to the other surface of the panel P from above the panel P without reversing the panel P.

The system 1000 for manufacturing a display unit may include a transport unit 100, a cutting unit 200, a separating unit 300, an attaching unit 400, and a winding unit 500.

The transport unit 100 may repeatedly transport the optical film OF, on which the polarizing film PF and the release film RF separably attached to the polarizing film PF are laminated, by a predetermined transport length I and may repeatedly stop the transport of the optical film OF. Here, the predetermined transport length I may be determined based on a length of a long side or a short side of the panel P which is an object to which the polarizing film PF is to be attached. In more detail, the predetermined transport length I may be determined based on a length of a long side or a short side of an attachment region which is determined as a region, in which the polarizing film PF needs to be attached, in the entire region of a surface of the panel P. Hereinafter, for convenience of description, on the assumption that a size of the attachment region is equal to a size of the surface of the panel P, a configuration in which the predetermined transport length I is determined based on the length of the long side or the short side of the panel P will be described.

The polarizing film PF, which extends in an elongated manner, is cut at a predetermined interval corresponding to the length of the panel P, thereby forming sheet pieces. To cut the polarizing film PF at the predetermined interval, a slit line is formed by the cutting unit 200 to be described below at a predetermined cutting position when the optical film OF on which the polarizing film PF and the release film RF are laminated is transported by the predetermined transport length I and then stopped, and a next slit line may be formed by the cutting unit 200 at the predetermined cutting position when the optical film OF is transported by the predetermined transport length I and then stopped again. The predetermined transport length I may be a sum of a length of the sheet piece and an interval at which the successive sheet pieces are spaced apart from each other by the slit line. Because a predetermined interval is formed between the two successive sheet pieces by the slit line, a length between the sheet pieces may not be uniform if the optical film OF is transported without considering the interval.

The transport unit 100 may include various conveying means capable of transporting the optical film OF. For example, the transport unit 100 may transport the optical film OF by using a conveyor belt or rollers.

The cutting unit 200 cuts the optical film OF in a width direction at the predetermined cutting position without cutting the release film RF, thereby forming the slit line in the optical film OF. That is, the cutting unit 200 cuts the polarizing film PF and the adhesive layer, from the opposite side to the release film RF, in the width direction to a predetermined depth such that continuity of the release film RF may be maintained, thereby forming the slit line in the optical film OF. Further, the cutting unit 200 may form the slit lines sequentially in the optical film OF at intervals corresponding to the length of the panel P. That is, the cutting unit 200 forms the slit line in the optical film OF by cutting the optical film OF when the transport of the optical film OF is stopped, and the cutting unit 200 forms the next slit line by cutting the optical film OF when the cutting process is stopped while the optical film OF is transported by the predetermined transport length I by the transport unit 100, and then the transport of the optical film OF is stopped, thereby forming the sheet piece of the polarizing film PF, which is defined by the two slit lines and has a length corresponding to the length of the panel P. For example, the slit lines may be sequentially formed, at the intervals corresponding to the length of the long side of the panel P, in the optical film OF which is attached to one surface of the panel P and has a width corresponding to the length of the short side of the panel P, or the slit lines may be sequentially formed, at the intervals corresponding to the length of the short side of the panel P, in the optical film OF which is attached to the other surface of the panel P and has a width corresponding to the length of the long side of the panel P.

The cutting unit 200 may include various cutting means capable of cutting the optical film OF. For example, a laser unit, a cutter, or the like may be used as the cutting unit 200.

The separating unit 300 may separate the sheet piece of the polarizing film PF from the release film RF. Here, the separating unit 300 may separate the polarizing film PF together with the adhesive layer from the release film RF by folding the release film RF inward from the optical film OF transported by the transport unit 100. A knife edge portion may be formed at a tip portion of the separating unit 300, and a radius of curvature of the knife edge portion may be 0.3 to 5.0 mm. A transport direction of the polarizing film PF of the optical film OF being transported is not changed, but a transport direction of the release film RF is changed at the tip portion of the separating unit 300, such that the release film RF may be separated from the polarizing film PF. The release film RF separated by the separating unit 300 is collected by being wound by the winding unit 500.

The attaching unit 400 may attach the polarizing film PF, from which the release film RF is separated, to one surface of the panel P. The attaching unit 400 may include a pair of attaching rolls. The pair of attaching rolls may be movable in an up and down direction, and at least one of the pair of attaching rolls may be rotated by a motor. A rubber roller or a metal roller may be used as the pair of attaching rolls.

The separated polarizing film PF and the panel P, which are transported to the attaching unit 400, are positioned between the pair of attaching rolls, and the pair of attaching rolls is pressed against each other, such that the polarizing film PF may be attached to one surface of the panel P. The polarizing film PF may be attached to the panel P while maintaining flatness of the polarizing film PF and the panel P in order to prevent bubbles and the like from being generated between the polarizing film PF and the panel P when attaching the polarizing film PF.

FIG. 3 is a view for explaining a position relationship of a horizontal roll according to the exemplary embodiment of the present invention.

Meanwhile, the transport unit 100 may include a horizontal roll 110 which is disposed at a downstream side in the transport direction of the optical film OF so as to be spaced apart from the cutting position where the cutting unit 200 forms the slit line in the optical film OF, and the horizontal roll 110 supports the optical film OF and horizontally transports the optical film OF.

The horizontal roll 110 may be positioned at an upper or lower side of the optical film OF, and may support the polarizing film PF and the release film RF of the optical film OF while being in line-to-line contact with the polarizing film PF and the release film RF.

The plurality of horizontal rolls 110 may be provided and positioned at a position satisfying the following conditional expression so that the slit line formed in the optical film OF is not positioned on the horizontal roll 110 when the transport of the optical film OF by the transport unit 100 is stopped.

$$I*n < H < I*(n+1)$$  <Conditional Expression 1>

Here, I is the predetermined transport length of the optical film OF, n is an integer equal to or greater than 0, and H is a horizontal distance between a rotation center C1 of the horizontal roll 110 and the cutting position.

The description will be made on the assumption that the panel P used to manufacture a display unit has the long side of 1200 mm and the short side of 700 mm, the optical film OF attached to one surface of the panel P has a width corresponding to the short side of the panel P, and the sheet piece having a length of 1200 mm corresponding to the long side of the panel P needs to be formed from the polarizing film PF on the optical film OF. Here, it is assumed that an interval between the successive sheet pieces which are spaced apart from each other by the slit line is 20 μm on average.

In this case, the predetermined transport length I of the optical film OF may be set to 1200 mm based on the length of the sheet piece. More particularly, the predetermined transport length I may be set to 1200.02 mm which is a sum of the length of the sheet piece and the interval between the successive sheet pieces which are spaced apart from each other by the slit line. For convenience of description, the description will be made on the assumption that the predetermined transport length I is set to 1200 mm based on the length of the sheet piece.

As an exemplary embodiment related to the position of the horizontal roll 110, if the position of the rotation center C1 of the horizontal roll 110 needs to be disposed adjacent to a position spaced apart from the cutting position by 2500 mm, n is 2 by Conditional Expression 1, and as a result, the position of the horizontal roll 110 may be set such that a horizontal distance H between the rotation center of the horizontal roll 110 and the cutting position is greater than 2400 mm (=1200*2 mm) and smaller than 3600 mm (=1200*3 mm). Therefore, the slit line in the optical film OF may not be positioned on the horizontal roll 110 even though the transport of the optical film OF is stopped after the optical film OF in which the slit line is formed by the cutting unit 200 is repeatedly transported by the predetermined transport length.

Therefore, according to the system for manufacturing a display unit according to the present invention, it is possible to prevent problems in the related art in that as tension is applied to the optical film because the slit line abuts against the transport direction changing roll when the optical film is stopped, the optical film is deformed because an end portion of the sheet piece of the polarizing film is separated from the release film when the transport direction changing roll abuts against the release film, foreign substances are attached to the adhesive layer of the polarizing film separated from the release film, a part of the release film is torn or split, or the end portion of the sheet piece of the polarizing film is deformed as the end portion of the sheet piece of the polarizing film is pressed when the transport direction changing roll abuts against the polarizing film.

The horizontal roll may be positioned at a position further satisfying the following conditional expression.

$$I*(n+0.3) \leq H \leq I*(n+0.7)$$ <Conditional Expression 2>

Here, I is the predetermined transport length of the optical film OF, n is an integer equal to or greater than 0, and H is the horizontal distance between the rotation center C1 of the horizontal roll 110 and the cutting position.

Therefore, the position of the horizontal roll 110 may be set by Conditional Expression 2 so that the horizontal distance H between the rotation center of the horizontal roll 110 and the cutting position is equal to or greater than 2760 mm (=1200*(2+0.3) mm) and equal to or smaller than 3240 mm (=1200*(2+0.7) mm). Therefore, the slit line in the optical film OF may be positioned to be sufficiently spaced apart from the horizontal roll 110 even though the transport of the optical film OF is stopped after the optical film OF in which the slit line is formed by the cutting unit 200 is repeatedly transported by the predetermined transport length.

The position of the horizontal roll 110 may be most particularly set such that the horizontal distance H between the rotation center C1 of the horizontal roll 110 and the cutting position is I*(n+0.5). That is, in a case in which the horizontal roll 110 is positioned at a position where the horizontal roll 110 and the optical film OF abut against each other at an intermediate point between the successive slit lines, tension, which may affect the pair of slit lines positioned at both sides based on the contact point, is minimized, and as a result, it is possible to minimize the problem with deformation of the optical film.

FIG. 4 is a view for explaining a position relationship between a transport direction changing roll and a vertical roll according to another exemplary embodiment of the present invention.

Because a system for manufacturing a display unit according to another exemplary embodiment is mostly identical to the system for manufacturing a display unit according to the aforementioned exemplary embodiment in terms of the configuration and the effect, the description will be made based on the differences.

The transport unit 100 may include a transport direction changing roll 130 which is disposed at a downstream side in the transport direction of the optical film OF so as to be spaced apart from the cutting position where the cutting unit 200 forms the slit line in the optical film OF, and the transport direction changing roll 130 changes the transport direction of the optical film OF.

The transport direction changing roll 130 is positioned at an upper or lower side of the optical film OF, and a predetermined region of an outer circumferential surface of the transport direction changing roll 130 supports the optical film OF and the release film RF while being in surface-to-surface contact with the optical film OF and the release film RF, thereby changing the transport direction of the optical film OF.

The transport direction changing roll 130 may be positioned at a position satisfying the following conditional expressions so that the slit line formed in the optical film OF is not positioned on the transport direction changing roll 130 when the transport of the optical film OF by the transport unit 100 is stopped.

$$L1 > I*m$$ <Conditional Expression 3>

$$L2 < I*(m+1)$$ <Conditional Expression 4>

Here, I is the predetermined transport length of the optical film OF, m is an integer equal to or greater than 0, L1 is a length of the optical film OF from a position O where the slit line is formed in the optical film OF to a position S1 where the optical film OF and the transport direction changing roll 130 begin to come into contact with each other, and L2 is a length of the optical film OF from the position O where the slit line is formed in the optical film OF to a position T1 where the contact between the optical film OF and the transport direction changing roll 130 is terminated.

The description will be made on the assumption that the panel P used to manufacture a display unit has the long side of 1200 mm and the short side of 700 mm, the optical film OF attached to one surface of the panel P has the width corresponding to the short side of the panel P, and the sheet piece having a length of 1200 mm corresponding to the long side of the panel P needs to be formed from the polarizing film PF on the optical film OF. Here, it is assumed that an interval between the successive sheet pieces which are spaced apart from each other by the slit line is 20 μm on average.

In this case, the predetermined transport length I of the optical film OF may be set to 1200 mm based on the length of the sheet piece. More particularly, the predetermined transport length I may be set to 1200.02 mm which is a sum of the length of the sheet piece and the interval between the successive sheet pieces which are spaced apart from each other by the slit line. For convenience of description, the description will be made on the assumption that the predetermined transport length I is set to 1200 mm based on the length of the sheet piece.

In addition, as an exemplary embodiment related to the position of the transport direction changing roll 130, the description will be made on the assumption that the transport direction changing roll 130 needs to be disposed adjacent to a position spaced apart by 5000 mm from the position O where the slit line is formed in the optical film OF based on the length of the optical film OF which extends along a transport path of the optical film OF.

Since m is 4 by Conditional Expression 3, the position of the transport direction changing roll 130 may be set such that the length L1 of the optical film OF from the position O where the slit line is formed in the optical film OF to the position S1 where the optical film OF and the transport direction changing roll 130 begin to come into contact with each other is greater than 4800 mm (=1200*4 mm) and the length L2 of the optical film OF from the position O where the slit line is formed in the optical film OF to the position T1 where the contact between the optical film OF and the transport direction changing roll 130 is terminated is smaller than 6000 mm (=1200*(4+1) mm) by Conditional Expression 4.

Here, the length L2 of the optical film OF from the position O where the slit line is formed in the optical film OF to the position T1 where the contact between the optical film OF and the transport direction changing roll 130 is terminated is equal to a sum of the length L1 of the optical film OF from the position O where the slit line is formed to the position S1 where the optical film OF and the transport direction changing roll 130 begin to come into contact with each other and a length α of the optical film OF in a region in which the optical film OF and the transport direction changing roll 130 are in contact with each other.

$$(L2=L1+\alpha)$$

Therefore, the slit line in the optical film OF may not be positioned on the transport direction changing roll 130 even though the transport of the optical film OF is stopped after the optical film OF in which the slit line is formed by the cutting unit 200 is transported by the predetermined transport length.

Therefore, according to the system for manufacturing a display unit according to the present invention, it is possible to prevent problems in the related art in that as tension is applied to the optical film because the slit line abuts against the transport direction changing roll when the optical film is stopped, the optical film is deformed because an end portion of the sheet piece of the polarizing film is separated from the release film when the transport direction changing roll abuts against the release film, foreign substances are attached to the adhesive layer of the polarizing film separated from the release film, a part of the release film is torn or split, or the end portion of the sheet piece of the polarizing film is deformed as the end portion of the sheet piece of the polarizing film is pressed when the transport direction changing roll abuts against the polarizing film.

The transport direction changing roll may be positioned at a position satisfying the following conditional expressions.

$$L1 \geq I^*(m+0.3) \qquad \text{<Conditional Expression 5>}$$

$$L2 \leq I^*(m+0.7) \qquad \text{<Conditional Expression 6>}$$

Here, I is the predetermined transport length of the optical film OF, m is an integer equal to or greater than 0, L1 is the length of the optical film OF from the position O where the slit line is formed in the optical film OF to the position S1 where the optical film OF and the transport direction changing roll 130 begin to come into contact with each other, and L2 is the length of the optical film OF from the position O where the slit line is formed in the optical film OF to the position T1 where the contact between the optical film OF and the transport direction changing roll 130 is terminated.

Therefore, the position of the transport direction changing roll 130 may be set such that the length L1 of the optical film OF from the position O where the slit line is formed in the optical film OF to the position S1 where the optical film OF and the transport direction changing roll 130 begin to come into contact with each other is equal to or greater than 5160 mm (=1200*(4+0.3) mm) by Conditional Expression 5, and the length L2 of the optical film OF from the position O where the slit line is formed in the optical film OF to the position T1 where the contact between the optical film OF and the transport direction changing roll 130 is terminated is smaller than 5640 mm (=1200*(4+0.7) mm) by Conditional Expression 6.

Therefore, the slit line of the optical film OF may be positioned to be sufficiently spaced apart from a contact region between the optical film OF and the transport direction changing roll 130 even though the transport of the optical film OF is stopped after the optical film OF in which the slit line is formed by the cutting unit 200 is repeatedly transported by the predetermined transport length.

Meanwhile, the transport direction changing roll 130 may change the transport direction of the optical film to a vertical direction. In this case, the transport unit 100 may include a vertical roll 150 which supports the optical film of which the transport direction is changed to the vertical direction by the transport direction changing roll 130 while being in contact with the optical film.

The vertical roll 150 may be positioned at a left or right side of the optical film OF which is transported vertically, and the vertical roll 150 may support the polarizing film PF and the release film RF of the optical film OF while being in contact with the polarizing film PF and the release film RF.

The vertical roll 150 may be positioned at a position satisfying the following conditional expression so that the slit line formed in the optical film OF is not positioned on the horizontal roll 110 when the transport of the optical film OF is stopped.

$$I^*q - L2 < V < I^*(q+1) - L2 \qquad \text{<Conditional Expression 7>}$$

Here, I is the predetermined transport length of the optical film OF, q is an integer equal to or greater than 0, L2 is the length of the optical film OF from the position O where the slit line is formed in the optical film OF to the position T1 where the contact between the optical film OF and the transport direction changing roll 130 is terminated, and V is a vertical distance between a rotation center C3 of the vertical roll 150 and the position T1 where the contact between the optical film OF and the transport direction changing roll 130 is terminated.

The description will be made on the assumption that the panel P used to manufacture a display unit has the long side of 1200 mm and the short side of 700 mm, the optical film OF attached to one surface of the panel P has the width corresponding to the short side of the panel P, and the sheet piece having a length of 1200 mm corresponding to the long side of the panel P needs to be formed from the polarizing film PF on the optical film OF. Here, it is assumed that an interval between the successive sheet pieces which are spaced apart from each other by the slit line is 20 μm on average.

In this case, the predetermined transport length I of the optical film OF may be set to 1200 mm based on the length of the sheet piece. More particularly, the predetermined transport length I may be set to 1200.02 mm which is a sum of the length of the sheet piece and the interval between the successive sheet pieces which are spaced apart from each other by the slit line. For convenience of description, the description will be made on the assumption that the predetermined transport length I is set to 1200 mm based on the length of the sheet piece.

In addition, as an exemplary embodiment related to the position of the vertical roll 150, the description will be made on the assumption that a position of a rotation center C5 of the vertical roll 150 needs to be disposed adjacent to a position spaced apart by 8000 mm, from the position O where the slit line is formed in the optical film OF based on the length of the optical film OF which extends along the transport path of the optical film OF. Further, it is assumed that the length L2 of the optical film OF from the position O where the slit line is formed in the optical film OF to the position T1 where the contact between the optical film OF and the transport direction changing roll 130 is terminated is 5500 mm.

Since q is 6 by Conditional Expression 7, the position of the vertical roll 150 may be set such that the vertical distance V between the rotation center C5 of the vertical roll 150 and the position T1 where the contact between the optical film OF and the transport direction changing roll 130 is terminated is greater than 1700 mm (=1200*6−5500 mm) and smaller than 2900 mm (=1200*(6+1)−5500 mm).

Therefore, the slit line in the optical film OF may not be positioned on the vertical roll 150 even though the transport of the optical film OF is stopped after the optical film OF in which the slit line is formed by the cutting unit 200 is transported by the predetermined transport length.

Therefore, according to the system for manufacturing a display unit according to the present invention, it is possible to prevent problems in the related art in that as tension is applied to the optical film because the slit line abuts against the vertical roll when the optical film is stopped, the optical film is deformed because an end portion of the sheet piece of the polarizing film is separated from the release film when the vertical roll abuts against the release film, foreign substances are attached to the adhesive layer of the polarizing film separated from the release film, a part of the release film is torn or split, or the end portion of the sheet piece of the polarizing film is deformed as the end portion of the sheet piece of the polarizing film is pressed when the vertical roll abuts against the polarizing film.

In a first example in which the vertical roll 150 is in line-to-line contact with the optical film OF being transported, the vertical roll 150 may be positioned at a position further satisfying the following conditional expression.

$$I*q-L2<V<I*(q+1)-L2 \qquad \text{<Conditional Expression 8>}$$

Here, I is the predetermined transport length of the optical film OF, q is an integer equal to or greater than 0, L2 is the length of the optical film OF from the position O where the slit line is formed in the optical film OF to the position T1 where the contact between the optical film OF and the transport direction changing roll 130 is terminated, and V is the vertical distance between the rotation center C3 of the vertical roll 150 and the position T1 where the contact between the optical film OF and the transport direction changing roll 130 is terminated to.

Therefore, the position of the vertical roll 150 may be set such that the vertical distance V between the rotation center C5 of the vertical roll 150 and the position T1 where the contact between the optical film OF and the transport direction changing roll 130 is terminated is equal to or greater than 2060 mm (=1200*(6+0.3)−5500 mm) or smaller than 2540 mm (=1200*(6+0.7)−5500 mm) by Conditional Expression 8. Therefore, the slit line in the optical film OF may be positioned to be sufficiently spaced apart from the vertical roll 150 even though the transport of the optical film OF is stopped after the optical film OF in which the slit line is formed by the cutting unit 200 is repeatedly transported by the predetermined transport length.

The position of the vertical roll 150 may be most particularly set such that the vertical distance V between the rotation center C5 of the vertical roll 150 and the position T1 where the contact between the optical film OF and the transport direction changing roll 130 is terminated is I*(q+0.5)−L2. That is, in a case in which the rotation center C5 of the vertical roll 150 is positioned at a position where the vertical roll 150 and the optical film OF abut against each other at an intermediate point between the successive slit lines, an influence of tension applied to both of the slit lines positioned at both sides based on the contact point is minimized, and as a result, it is possible to minimize the problem with deformation of the optical film.

Meanwhile, the vertical roll 150 may be positioned at a position satisfying the following conditional expressions in a second example in which the direction to which the transport direction of the optical film OF is vertically changed by the transport direction changing roll 130 is a first direction, and the vertical roll 150 is in surface-to-surface contact with the optical film OF being transported in the first direction and changes the transport direction of the optical film OF to a second direction opposite to the first direction as illustrated in FIG. 4.

$$L3>I*r \qquad \text{<Conditional Expression 9>}$$

$$L4<I*(r+1) \qquad \text{<Conditional Expression 10>}$$

Here, I is the predetermined transport length, r is an integer equal to or greater than 0, L3 is a length of the optical film OF from the position O where the slit line is formed in the optical film OF to a position S2 where the optical film OF and the vertical roll 150 begin to come into contact with each other, and L4 is a length of the optical film OF from the position O where the slit line is formed in the optical film OF to a position T2 where the contact between the optical film OF and the vertical roll 150 is terminated.

Hereinafter, as the second example related to the position of the vertical roll 150, the description will be made based on a configuration in which the position of the rotation center C5 of the vertical roll 150 needs to be disposed adjacent to a position spaced apart by 8000 mm, from the position O where the slit line is formed in the optical film OF based on the length of the optical film OF which extends along the transport path of the optical film OF.

Since r is 6 by Conditional Expression 9, the position of the vertical roll 150 may be set such that the length L3 of the optical film OF from the position O where the slit line is formed in the optical film OF to the position S2 where the optical film OF and the vertical roll 150 begin to come into contact with each other is greater than 7200 mm (=1200*6 mm), and the length L4 of the optical film OF from the position O where the slit line is formed in the optical film OF to the position T2 where the contact between the optical film OF and the vertical roll 150 is terminated is smaller than 8400 mm (=1200*(6+1) mm) by Conditional Expression 10.

Here, the length L3 of the optical film OF from the position O where the slit line is formed to the position S2 where the optical film OF and the vertical roll 150 begin to come into contact with each other is equal to a sum of the length L2 of the optical film OF from the position O where the slit line is formed to the position T1 where the contact between the optical film OF and the transport direction changing roll 130 is terminated and the vertical distance between the rotation center C5 of the vertical roll 150 and the position T1 where the contact between the optical film OF and the transport direction changing roll 130 is terminated.

Further, the length L4 of the optical film OF from the position O where the slit line is formed in the optical film OF to the position T2 where the contact between the optical film OF and the vertical roll 150 is terminated is equal to a sum of the length L3 of the optical film OF from the position O where the slit line is formed to the position S2 where the optical film OF and the vertical roll 150 begin to come into contact with each other and a length of the optical film OF in a region in which the optical film OF and the transport direction changing roll 130 are in contact with each other, that is, a length of a half of an arc in a circular cross section of the vertical roll 150 ($\pi*R$ in which R is a radius of the vertical roll 150).

$$(L4=L3+\pi*R)$$

Therefore, the slit line in the optical film OF may not be positioned on the vertical roll 150 even though the transport of the optical film OF is stopped after the optical film OF in which the slit line is formed by the cutting unit 200 is transported by the predetermined transport length.

Therefore, according to the system for manufacturing a display unit according to the present invention, it is possible to prevent problems in the related art in that as tension is applied to the optical film because the slit line abuts against the vertical roll, which changes the transport direction of the optical film to the vertical direction, when the optical film is stopped, the optical film is deformed because an end portion of the sheet piece of the polarizing film is separated from the release film when the vertical roll abuts against the release film, foreign substances are attached to the adhesive layer of the polarizing film separated from the release film, a part of the release film is torn or split, or the end portion of the sheet piece of the polarizing film is deformed as the end portion of the sheet piece of the polarizing film is pressed when the vertical roll abuts against the polarizing film.

The vertical roll 150 may be positioned at a position satisfying the following conditional expressions.

$$L3 \geq I*(r+0.3) \qquad \text{<Conditional Expression 11>}$$

$$L4 \leq I*(r+0.7) \qquad \text{<Conditional Expression 12>}$$

Here, I is the predetermined transport length, r is an integer equal to or greater than 0, L3 is the length of the optical film OF from the position O where the slit line is formed in the optical film OF to the position S2 where the optical film OF and the vertical roll 150 begin to come into contact with each other, and L4 is the length of the optical film OF from the position O where the slit line is formed in the optical film OF to the position T2 where the contact between the optical film OF and the vertical roll 150 is terminated.

Therefore, the position of the vertical roll 150 may be set such that the length L3 of the optical film OF from the position O where the slit line is formed in the optical film OF to the position S2 where the optical film OF and the vertical roll 150 begin to come into contact with each other is equal to or greater than 7560 mm (=1200*(6+0.3) mm) by Conditional Expression 11, and the length L4 of the optical film OF from the position O where the slit line is formed in the optical film OF to the position T2 where the contact between the optical film OF and the vertical roll 150 is terminated is smaller than 8040 mm (=1200*(6+0.7) mm) by Conditional Expression 12.

Therefore, the slit line of the optical film OF may be positioned to be sufficiently spaced apart from a contact region between the optical film OF and the vertical roll 150 even though the transport of the optical film OF is stopped after the optical film OF in which the slit line is formed by the cutting unit 200 is repeatedly transported by the predetermined transport length.

It will be appreciated that the exemplary embodiments of the present invention have been described above for purposes of illustration, and those skilled in the art may easily modify the present invention in other specific forms without changing the technical spirit or the essential features of the present invention. Therefore, it should be understood that the above-described exemplary embodiments are illustrative in all aspects and do not limit the present invention. For example, each component described to be of a single type may be implemented in a distributed manner. Likewise, components described to be distributed can be implemented in a combined manner.

The scope of the present invention is represented by the claims to be described below rather than the detailed description, and it should be interpreted that the meaning and scope of the claims and all the changes or modified forms derived from the equivalent concepts thereto fall within the scope of the present invention.

The invention claimed is:

1. A system for manufacturing a display unit, the system comprising:
    a transport unit which repeatedly transports an optical film comprising, laminated in this order, a polarizing film, an adhesive layer, and a release film separably attached to the adhesive layer, by a predetermined transport length and repeatedly stops the transport of the optical film;
    a cutting unit which cuts the optical film in a width direction at a predetermined cutting position without cutting the release film to form a slit line in the optical film;
    a separating unit which separates the release film from the polarizing film at the slit line to form a sheet piece of the polarizing film; and
    an attaching unit which attaches the sheet piece, from which the release film is separated, to a panel,
    wherein the transport unit includes a horizontal roll which is disposed at a downstream side in a transport direction so as to be spaced apart from the cutting position,
    wherein the horizontal roll transports the optical film in a horizontal direction, and the horizontal roll satisfies Conditional Expression 1 so that the slit line is not positioned on the horizontal roll when the transport of the optical film is stopped:

$$I*n<H<I*(n+1) \quad \text{Conditional Expression 1:}$$

wherein I is the predetermined transport length, which is a sum of a length of the sheet piece and an interval at which successive sheet pieces are spaced apart from each other by the slit line, n is an integer equal to or greater than 0, and H is a horizontal distance between a rotation center of the horizontal roll and the cutting position.

2. The system of claim 1, wherein the horizontal roll satisfies Conditional Expression 2:

$$I*(n+0.3) \leq H \leq I*(n+1) \quad \text{Conditional Expression 2:}$$

wherein I, n and H are as previously defined.

3. A system for manufacturing a display unit, the system comprising:
a transport unit which repeatedly transports an optical film comprising, laminated in this order, a polarizing film, an adhesive layer, and a release film separably attached to the adhesive layer, by a predetermined transport length and repeatedly stops the transport of the optical film;
a cutting unit which cuts the optical film in a width direction at a predetermined cutting position without cutting the release film so as to form a slit line in the optical film;
a separating unit which separates the polarizing film from the release film at the slit line to form a sheet piece of the polarizing film; and
an attaching unit which attaches the sheet piece polarizing film, which is separated from the release film, to a panel,
wherein the transport unit includes a transport direction changing roll which is disposed at a downstream side in a transport direction so as to be spaced apart from the cutting position,
wherein the transport direction changing roll and changes the transport direction of the optical film, and satisfies Conditional Expressions 3 and 4 so that the slit line is not positioned on the transport direction changing roll when the transport of the optical film is stopped:

$$L1 \geq I*m \quad \text{Conditional Expressions 3:}$$

$$L2 < I*(m+1) \quad \text{Conditional Expressions 4:}$$

wherein I is the predetermined transport length, which is a sum of a length of the sheet piece and an interval at which successive sheet pieces are spaced apart from each other by the slit line, m is an integer equal to or greater than 0, L1 is a length of the optical film from a position where the slit line is formed in the optical film to an initial point of contact between the optical film and the transport direction changing roll, and L2 is a length of the optical film from the position where the slit line is formed in the optical film to a final point of contact between the optical film and the transport direction changing roll.

4. The system of claim 2, wherein the transport direction changing roll satisfies Conditional Expressions 5 and 6:

$$L1 \geq I*(m+0.3) \quad \text{Conditional Expression 5:}$$

$$L2 < I*(m+0.7) \quad \text{Conditional Expression 6:}$$

wherein I, m, L1 and L2 are as previously defined.

5. A system for manufacturing a display unit, the system comprising:
a transport unit which repeatedly transports an optical film comprising, laminated in this order, a polarizing film, an adhesive layer, and a release film separably attached to the adhesive layer, by a predetermined transport length and repeatedly stops the transport of the optical film;
a cutting unit which cuts the optical film in a width direction at a predetermined cutting position without cutting the release film so as to form a slit line in the optical film;
a separating unit which separates the polarizing film from the release film at the slit line to form a sheet piece of the polarizing film; and
an attaching unit which attaches the sheet piece, which is separated from the release film, to a panel,
wherein the transport unit includes a transport direction changing roll which is disposed at a downstream side in a transport direction so as to be spaced apart from the cutting position and changes the transport direction of the optical film to a vertical direction, and a vertical roll which is in contact with and supports the optical film after while being in the transport direction is changed to the vertical direction, and
wherein the vertical roll satisfies Conditional Expression 7 so that the slit line is not positioned on the vertical roll when the transport of the optical film is stopped:

$$I*q-L2<V<I*(q+1)-L2 \quad \text{Conditional Expression 7:}$$

wherein I is the predetermined transport length, which is a sum of a length of the sheet piece and an interval at which successive sheet pieces are spaced apart from each other by the slit line, q is an integer equal to or greater than 0, L2 is a length of the optical film from a position where the slit line is formed in the optical film to a final point of contact between the optical film and the transport direction changing roll, and V is a vertical distance between a rotation center of the vertical roll and the final point of contact between the optical film and the transport direction changing roll.

6. The system of claim 5, wherein the vertical roll satisfies Conditional Expression 8:

$$I*(q+0.3)-L2 \leq V \leq I*(q+0.7)-L2 \quad \text{Conditional Expression 8:}$$

wherein I, q, L2 and V are as previously defined.

7. The system of claim 5, wherein the transport direction changing roll vertically changes the transport direction of the optical film to a first direction, and the vertical roll changes the transport direction of the optical film being transported in the first direction to a second direction opposite to the first direction, and
wherein the vertical roll satisfies Conditional Expressions 9 and 10:

$$L3 > I*r \quad \text{Conditional Expressions 9:}$$

$$L4 < I*(r+1) \quad \text{Conditional Expressions 10:}$$

wherein I is the predetermined transport length, r is an integer equal to or greater than 0, L3 is a length of the optical film from the position where the slit line is formed in the optical film to an initial point of contact between the optical film and the vertical roll, and L4 is a length of the optical film from the position where the slit line is formed in the optical film to a final point of contact between the optical film and the vertical roll.

8. The system of claim 7, wherein the vertical roll Conditional Expressions 11 and 12 satisfies the following conditional expressions:

$$L3 \geq I*(r+0.3) \qquad \text{Conditional Expressions 11:}$$

$$L4 \leq I*(r+0.7) \qquad \text{Conditional Expressions 12:}$$

wherein I, r, L3 and L4 are as previously defined.

* * * * *